Jan. 31, 1933.        C. P. SCHLEGEL         1,895,689
MOLDING
Filed Oct. 18, 1932
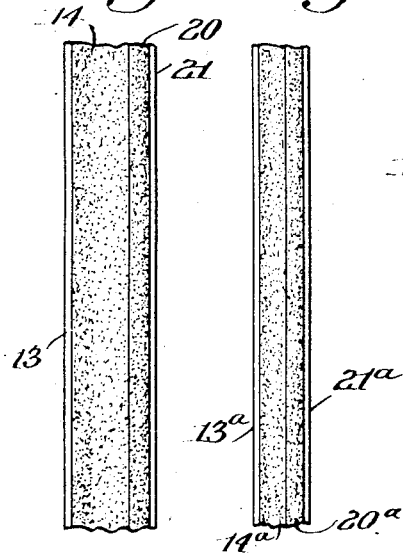
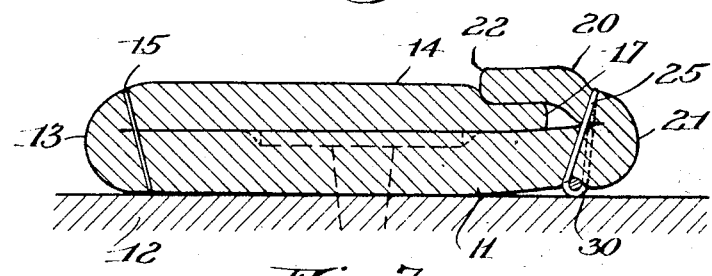
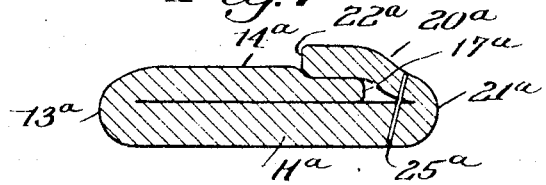
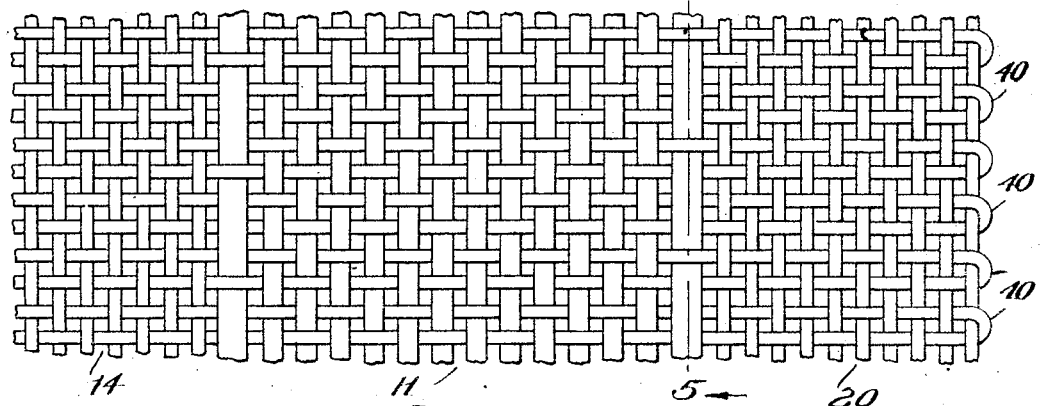
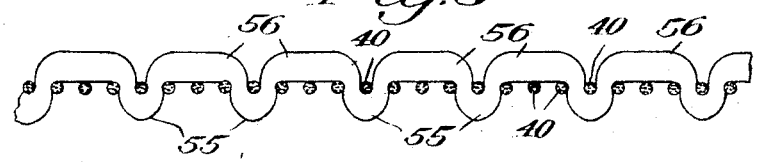
INVENTOR
Charles P. Schlegel
BY Edward H. Cumpston
his ATTORNEY Patented Jan. 31, 1933

1,895,689

UNITED STATES PATENT OFFICE

CHARLES P. SCHLEGEL, OF ROCHESTER, NEW YORK, ASSIGNOR TO THE SCHLEGEL MANUFACTURING COMPANY, OF ROCHESTER, NEW YORK, A CORPORATION OF NEW YORK

MOLDING

Application filed October 18, 1932. Serial No. 638,343.

This invention relates to molding strips for trimming and finishing upholstery such, for example, as in automobile bodies, and pertains more particularly to the blind nail variety of molding comprising an attaching base portion for receiving the fastening means, a cover piece extending over and concealing the fastening means, and a locking portion for releasably engaging and securing the cover piece in closed position over the fastening means.

Mountings of this variety have been formed from a more or less flexible fabric folded along spaced lines to provide the attaching base or nail receiving portion, the cover piece and locking piece, but in order to impart the necessary stiffness to the molding, the cover piece and locking portion, and in some instances the base portion, have been provided with separately formed stiffening liners or fillers secured to or wrapped in portions of the fabric forming different parts of the molding. Such a construction involves the extra expense attendant upon making, assembling and securing together a plurality of separate elements, which are subject to becoming separated and disarranged in use, besides being bulky and unsightly, so that the resulting molding does not have the desired durability, economy and pleasing appearance.

One object of the present invention is the provision of a self-contained, one-piece molding capable of being fully formed by weaving all of the parts together in the loom.

Another object is to provide a molding of the character described and of the thin flat type desired by the automobile industry.

Another object is to provide a molding of this kind made from a single strip of fabric having an improved woven construction which not only imparts the desired stiffness to the molding without the use of attached stiffeners and liners but also provides means facilitating folding the strip to form its various parts.

A further object is the provision in a molding of this type of a simple and effective means for retaining the molding parts in proper assembled position to securely and permanently conceal the fastening means used to secure the molding to the upholstery.

A further object is the provision of such a molding which is pleasing and ornamental in appearance simple and durable in construction and inexpensive to manufacture and apply in use.

To these and other ends the invention resides in certain improvements and combinations of parts, all as will be hereinafter more fully described, the novel features being pointed out in the claims at the end of this specification.

In the drawing:

Fig. 1 is a plan or face view of a molding constructed in accordance with one embodiment of the invention;

Fig. 2 is a transverse sectional view across the molding illustrated in Fig. 1, being enlarged to show the relation of the various parts;

Fig. 3 is an enlarged fragmentary transverse sectional view of the woven strip from which the molding of Figs. 1 and 2 is formed, showing the method of imparting the desired stiffness to the molding and means for forming the fold line between the different portions on the strip;

Fig. 4 is a face view of portions of the strip viewed from above in Fig. 3;

Fig. 5 is a sectional view taken longitudinally of the strip substantially on the line 5—5 of Fig. 4, showing the method of weaving the strip along the fold lines, to provide weakened sections or breaks which facilitate the folding of the strip;

Fig. 6 is a view similar to Fig. 1 but showing a narrower type of molding, and

Fig. 7 is a view similar to Fig. 2 but showing the modification of Fig. 6.

The same reference numerals throughout the several views indicate the same parts.

The present application is a continuation in part of my copending application, Serial No. 595,684, filed February 29, 1932, relating to the same general type of molding but disclosing several improvements which are embodied in the present instance by way of illustration, in a self-contained, one-piece upholstery molding of the blind nail type made from a single piece of closely woven relatively stiff fabric folded to provide an attaching base portion for receiving the nails or other fastening means, marginal portions of the fabric strip being arranged to overlie the base portion from opposite sides to provide a cover piece for the fastening means and a locking portion for holding the cover piece in closed or nail concealing position. The strip is formed with a new and improved woven construction by which the desired stiffness is inherent in the woven fabric itself, without the necessity for attached stiffening liners, fillers or cores and which also facilitates the folding of the strip to form the cover piece and locking portion, as will be hereinafter more fully described.

Referring to the drawing, Fig. 2 shows one embodiment of the invention in a molding of the blind nail type formed from a single strip of closely woven, single ply, textile fabric having an intermediate or attaching base portion 11 adapted to receive the nails or other suitable fastening means (not shown) for securing the molding to a strip 12 such, for example, as the body of an automobile, as well understood in the art. One side of the strip is folded along the side edge 13 of the base portion, to provide a flat, single ply cover piece 14 hingedly secured, along the edge 13, to the base portion 11, and adapted to be folded to overlie the latter, as clearly shown in Fig. 2, to cover or conceal the fastening means which extend through the base portion 11 and into the support 12.

This cover piece may be woven sufficiently stiff, as hereafter described, so that when folded, in the manner illustrated in Fig. 1, it will remain in position on the base portion. In a wide molding, however, where the cover piece is wide, as shown in Fig. 2, and, therefore, tends to be somewhat flexible, it may be desirable to provide auxiliary stiffening means for the cover piece. This auxiliary stiffening means comprises, in the present embodiment, a row of stitching 15 extending through the cover piece 14 and the base portion 11 adjacent the fold line 13, as clearly illustrated in Fig. 2, to further stiffen the cover piece 14. The cover piece is also provided with a reduced marginal edge 17 which is adapted to be tucked under a locking member, hereafter described, to releasably hold the cover piece 14 on the base portion 11.

The cover piece is retained in position on the base portion 11 by means of a thin, flat cover holding member which preferably comprises a single ply locking member 20 formed by folding, along the side edge 21 of the base portion 11, the edge of the strip opposite to that from which the cover piece is formed. This locking member is of less width than the cover piece 14, and the free edge 22 thereof provides a stiff locking lip beneath which the reduced marginal edge 17 of the cover piece is arranged to be tucked as clearly shown in Fig. 2.

While the locking member 20 may be woven sufficiently stiff to retain the cover piece in position, it is preferred to provide auxiliary supporting and stiffening means, such for example, as a row of stitching 25 extending through the base portion and the locking member adjacent the fold line 21 to support and stiffen the locking lip 22. This stitching 25 is of sufficiently bulky form or made with a sufficiently heavy thread to appreciably project below the base portion 11 and form a longitudinally extending rib 30 which tends to hold the portion 11, adjacent the fold 21, in elevated position above the support 12, as clearly illustrated in Fig. 2, the purpose of which construction will be hereafter pointed out. A chain or any other suitable form of stitching may be used with a suitably heavy thread to give the desired body and elevating effect to the rib 30.

It is apparent from Fig. 2 that when the fastening means, not shown, are driven through the base portion 11 and into the support 12, the part of the base portion to the left of the rib 30 is drawn into engagement with the support 12, and the base portion is slightly turned about the rib 30 as a fulcrum to lift the edge 21 upwardly, as will be apparent from an inspection of Fig. 2. This upward movement of the edge 21 tilts the locking member 20 inwardly and into tight engagement with the marginal edge 17 to firmly but releasably hold the cover piece 14 on the base portion 11. This novel arrangement not only supports and stiffens the locking member, but also provides a simple and effective means for retaining the molding parts in proper assembled relation.

The present invention also provides a new and improved woven construction which imparts the desired stiffness to the molding parts, and facilitates the folding and arranging of the cover piece 14 and the locking member 20. Referring to Figs. 3 and 4, there is shown an enlarged section of the strip from which the above described molding is formed. This strip is made up of a plurality of weft strands 40, and a plurality of warp strands 41 interlocked with the weft strands 40 in a manner clearly shown in Fig. 4. A large number of these warp strands 41, particularly those in the base portion 11, are formed of relatively stiff or coarse twisted textile material, as indicated in Figs. 3 and 4, to afford a relatively stiff fabric which is capable of maintaining the shape and arrangement of the molding parts, without the use of auxiliary cores or liners. While these heavy or coarse warp strands have been shown in connection with the base portion only, it is contemplated that they may also be used in the cover piece 14 and/or the locking member 20 to give additional stiffness to these parts. If the cover piece 14 is made sufficiently stiff by incorporating therein a sufficient number of these heavy warp strands 41, the row of stitching 15 may be eliminated if desired.

By means of such a woven construction, the stiffening means for the entire molding is woven in and forms an integral part of the strip, and thus obviates the use of auxiliary attached stiffening liners or fillers of the type found in the usual form of moldings of this class. Such an arrangement not only affords a self contained one-piece molding which is capable of being manufactured at a minimum of cost, but also provides a molding strip which may be woven sufficiently stiff in the loom so that when stitched down, as shown at 15 and 25, it is complete in form.

To facilitate the folding of the cover piece 14 and the locking member 20, the strip is woven so as to provide breaks or weakened sections, generally indicated by the numeral 45, which extend along the fold lines 13 and 21. These breaks provide flexible hinge like members which connect the base portion 11 to the cover piece 14 and the locking member 20, and facilitate the folding of the strip to form the molding parts as above described.

Each of these breaks is formed, in the present instance, by substituting for the heavy warp strands 41 a number of finer or less bulky, straight, untwisted flexible warp strands arranged in the form of a bundle 50 which extends along the fold line 13 or 21, as clearly illustrated in Figs. 3 and 4. Each of these bundles of warp strands is especially woven in, for example, by a method which may be described as "three up and one down", as viewed from the face side of the strip, or the side of the base portion 11 laid against the support 12. As viewed from this side of the strip, the strands forming each of the bundles 50 are caught, as a unit, at spaced points under the weft strands 40, as shown at 55, Fig. 5. Intermediate these points, each bundle of strands extends over two or more, in the present instance three, adjacent weft strands 40, and forms relatively long flat loops 56 positioned on the face side of the strip, as clearly shown in Figs. 3 and 4. By means of this arrangement, the finer flexible warp strands which form the breaks 45 are mostly on the face side of the strip, or in other words, on the outside of the folds 13 and 21, as shown in Fig. 3, so as to facilitate the folding of the strip to form the cover piece 14 and the locking member 20.

It is sometimes necessary, or at least desirable, to use a molding which is narrower than that illustrated in Figs. 1 and 2. Figs. 6 and 7 show such a narrow molding formed from a strip of textile material similar to but narrower than that used in the wider molding illustrated in Figs. 1 and 2, and having an attaching base portion 11ª, a cover piece 14ª overlying the base portion and secured thereto along the fold line 13ª, and a cover piece 20ª secured along the line 21ª to the base portion 11 and having the inner free edge or locking lip 22ª thereof arranged to overlie the reduced marginal edge 17ª of the cover piece 14ª, which construction is clearly illustrated in Fig. 7 of the drawing. In this narrow molding, it is unnecessary to stiffen the cover piece 14 by stitching it to the base, as shown in Fig. 2, assuming, of course, that the cover piece is woven reasonably stiff. The locking member is, however, further stiffened and supported by means of a row of stitching 25ª which extends through the base portion 11ª and the locking member 20ª to support and stiffen the latter. This row of stitching may be of the plain type shown in Fig. 7, or of the type shown in Fig. 2.

It is apparent from the above description that the present invention provides a self-contained one-piece molding which is woven sufficiently stiff in the loom to provide an inherently stiff fabric, which, when folded and stitched as above described, is complete in form and capable of maintaining the closed arrangement of the molding parts and the general shape of the whole without the use of attached stiffening liners or fillers. The present invention affords also an improved woven construction which facilitates the folding of the strip and also provides a simple and effective means for concomitantly supporting and stiffening the locking lip and for tilting it inwardly into engagement with the cover piece to firmly but releasably hold the latter on the base portion.

The invention thus provides a molding construction which is inexpensive to manufacture and adapted to be quickly and easily applied in place. The thin flat construction which it affords offers the least likelihood of contact with objects which might tend to detach it or derange its parts, while at the same time presenting a pleasing and attractive appearance.

While certain embodiments of the invention have been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

I claim:

1. A self-contained, one-piece upholstery molding formed from a single strip of fabric woven with relatively stiff strands to afford inherent stiffness and permanency of form, said strip comprising an attaching base portion, a cover piece hinged to one side edge of said base portion and folding thereover, and a locking member hinged to the opposite side edge of said base portion and folded inwardly over and stitched to said base portion to overlap and releasably hold said cover piece in folded position, said fabric strip being woven to provide breaks adjacent said side edges to facilitate said folding of the cover piece and the locking member.

2. A self-contained, one-piece upholstery molding formed from a single strip of fabric woven with relatively stiff strands to afford inherent stiffness and permanency of form, said strip comprising an attaching base portion, a single ply cover piece hinged to one side edge of said base portion and folding thereover, and a single ply locking member hinged to the opposite side edge of said base portion and folded inwardly over and stitched to said base portion to overlap and releasably hold said cover piece in folded position, said fabric strip being woven to provide breaks adjacent said said edges to facilitate said folding of the cover piece and the locking member.

3. A self-contained, one-piece upholstery molding formed from a single strip of fabric woven with relatively stiff strands to afford inherent stiffness and permanency of form, said strip comprising an attaching base portion, a cover piece hinged to one side edge of said base portion and folding thereover, and a locking member hinged to the opposite side edge of said base portion and folded inwardly over and stitched to said base portion to overlap and releasably hold said cover piece in folded position, said strip being woven with relatively loose warp strands adjacent said side edges to form breaks between the base portion and the locking member and cover piece to facilitate the folding of the strip.

4. A self-contained, one-piece upholstery molding formed from a single piece of relatively stiff woven fabric and comprising, in combination, an attaching base portion adapted to receive fastening means, a single ply cover piece hinged to one side edge of said base portion and folding thereover, a flat narrow locking member hinged to the opposite side edge of said base portion and folded inwardly over said base portion to overlap and releasably hold said cover piece in folded position, and a row of stitching extending through said base portion and said locking member to support and stiffen the latter, said stitching having a part projecting below said base portion and serving to tilt said locking member inwardly over said cover piece when said fastening means are secured to a support.

5. A self-contained, one-piece upholstery molding formed from a single strip of fabric woven with relatively stiff strands to afford inherent stiffness and permanency of form, said strip comprising an attaching base portion adapted to receive fastening means, a cover piece hinged to one side edge of said base portion and folding thereover, a locking member hinged to the opposite edge of said base portion and folded inwardly over said base portion to overlap and releasably hold said cover piece in folded position, and a row of stitching extending through said base portion and said locking member adjacent said opposite edge to support and stiffen said locking member, said stitching having a part thereof projecting below said base portion and serving to tilt the locking member inwardly and into engagement with said cover piece when said fastening means are secured to a support.

6. A self-contained, one-piece upholstery molding formed from a single strip of fabric woven with relatively stiff strands to afford inherent stiffness and permanency of form, said strip comprising an attaching base portion, a cover piece hinged to one side edge of said base portion and folding thereover, a locking member hinged to the opposite side edge of said base portion and folded inwardly over said base portion to overlap and releasably hold said cover piece in folded position, and a row of stitching extending through said base portion and said locking member for concomitantly supporting and stiffening the locking member and for tilting it inwardly to engage said cover piece, said fabric strip being woven to provide breaks adjacent said side edges to facilitate said folding of the cover piece and the locking member.

7. A self-contained, one-piece upholstery molding formed from a single strip of fabric woven with relatively stiff strands to afford inherent stiffness and permanency of form, said strip comprising an attaching base portion, a cover piece hinged to one side edge of said base portion and folding thereover, a row of stitching extending through said base portion and said cover piece adjacent said edge to stiffen the cover piece, a flat narrow locking member hinged to the opposite side edge of said base portion and folded inwardly over said base portion to overlap and releasably hold said cover piece, and a row of stitching extending through said base portion and said locking member adjacent said opposite edge and serving to support and stiffen the locking member.

8. A self-contained, one-piece upholstery molding formed from a single strip of fabric woven with relatively stiff strands to afford inherent stiffness and permanency of form, said strip comprising an attaching base portion, a cover piece hinged to one side edge of said base portion and folding thereover, a row of stitching extending through said base portion and said cover piece adjacent said edge to stiffen the cover piece, a flat narrow locking member hinged to the opposite side edge of said base portion and folded inwardly over said base portion to overlap and releasably hold said cover piece, and a row of stitching extending through said base portion and said locking member adjacent said opposite edge and serving to support and stiffen the locking member, said strip being woven to provide breaks adjacent said edges to facilitate said folding of the cover piece and the locking member.

9. A self-contained, one-piece upholstery molding formed from a single strip of fabric woven with relatively stiff strands to afford inherent stiffness and permanency of form, said strip comprising an attaching base portion adapted to receive fastening means, a cover piece hinged to one side edge of said base portion and folding thereover, a locking member hinged to the opposite edge of said base portion and folded inwardly over said base portion to overlap and releasably hold said cover piece in folded position, said strip being woven to provide breaks along said side edges to facilitate the folding of said cover piece and said locking member, and a row of stitching extending through said base portion and said locking member to stiffen the latter, said stitching having a part thereof projecting below said base portion and serving to tilt the locking member inwardly and into engagement with said cover piece when said fastening means are secured to a support.

10. A self-contained, one-piece upholstery molding formed from a single strip of fabric woven with relatively stiff warp strands to afford inherent stiffness and permanency of form, said strip comprising an attaching base portion adapted to receive fastening means, a single ply cover piece hinged to one side edge of said base portion and folding thereover, a row of stitching extending through said base portion and said cover piece adjacent said edge to stiffen the cover piece, a single ply locking member hinged to the opposite side edge of said base portion and folded inwardly over said base portion to overlap and releasably hold said cover piece in folded position, said fabric being woven to provide breaks adjacent said side edges to facilitate said folding of the cover piece and the locking member, and a row of stitching extending through said base portion and said locking member to support and stiffen the latter, said last mentioned stitching having a part thereof projecting below said base portion and serving to tilt said locking member into engagement with said cover piece when said fastening means are secured to a support.

CHARLES P. SCHLEGEL.